US009222826B2

(12) United States Patent
Cavina

(10) Patent No.: US 9,222,826 B2
(45) Date of Patent: Dec. 29, 2015

(54) APPARATUS FOR WEIGHING ELONGATE CONTAINERS SUPPLIED ALONG A CONVEYOR LINE

(75) Inventor: Luigi Cavina, Bologna (IT)

(73) Assignee: I.M.A. Industrial Macchine Automatiche S.P.A., Ozzano dell' Emilia (IT)

(*) Notice: Subject to any disclaimer, the term of this patent is extended or adjusted under 35 U.S.C. 154(b) by 236 days.

(21) Appl. No.: 14/000,994

(22) PCT Filed: Feb. 20, 2012

(86) PCT No.: PCT/IB2012/050767
§ 371 (c)(1),
(2), (4) Date: Aug. 22, 2013

(87) PCT Pub. No.: WO2012/120395
PCT Pub. Date: Sep. 13, 2012

(65) Prior Publication Data
US 2013/0327580 A1 Dec. 12, 2013

(30) Foreign Application Priority Data
Mar. 4, 2011 (IT) .............................. BO2011A0105

(51) Int. Cl.
G01G 15/00 (2006.01)
G01G 17/00 (2006.01)
(52) U.S. Cl.
CPC ................ G01G 15/00 (2013.01); G01G 17/00 (2013.01)
(58) Field of Classification Search
CPC ..... G01G 11/003; G01G 15/00; G01G 17/00; B65B 43/46; B65B 43/52
USPC .......................................................... 177/145
See application file for complete search history.

(56) References Cited

U.S. PATENT DOCUMENTS

| 5,004,093 | A | * | 4/1991 | Blezard | 198/430 |
| 5,193,630 | A | * | 3/1993 | Cane | 177/50 |
| 5,606,153 | A | * | 2/1997 | Fix et al. | 177/145 |
| 5,934,859 | A |   | 8/1999 | Goetzelmann | |
| 6,627,826 | B2 | * | 9/2003 | Cavina et al. | 177/145 |
| 6,800,818 | B2 | * | 10/2004 | Balboni et al. | 177/52 |
| 8,247,711 | B2 | * | 8/2012 | Troisi et al. | 177/145 |
| 2002/0157879 | A1 | * | 10/2002 | Cavina et al. | 177/145 |
| 2007/0050315 | A1 |   | 3/2007 | Rabindran | |
| 2010/0285614 | A1 | * | 11/2010 | Wilby | 438/14 |

FOREIGN PATENT DOCUMENTS

EP 1194333 10/2003
WO WO2010/127936 A1 11/2010

* cited by examiner

Primary Examiner — Randy W Gibson
(74) Attorney, Agent, or Firm — R. Neil Sudol; Henry D. Coleman

(57) ABSTRACT

An apparatus (1) for weighing elongate containers (5) supplied along a conveyor line (4) comprises: weighing means (2); a support member (6) suitable for restingly receiving at least a container (5); a first articulated system (7) and a second articulated system (12); the apparatus (1) being configured such as to impart, by means of the first articulated system (7) and the second articulated system (12), a translating and rotating motion to the support member (6) such as to transfer the containers (5) from a first position (K1), in which the support member (6) is arranged at the conveyor line (4) such as to receive therefrom the containers (5) to be weighed, and a second position (K2) in which the support member (6) engages with the weighing means (2) such as to enable the containers (5) to be weighed in an inclined position, and vice versa.

11 Claims, 5 Drawing Sheets

APPARATUS FOR WEIGHING ELONGATE CONTAINERS SUPPLIED ALONG A CONVEYOR LINE

FIELD OF THE INVENTION

The present invention relates to the technical sector of devices for weighing containers supplied along a conveyor line. In particular, the invention relates to a device suitable for weighing elongate containers, i.e. containers having a longitudinal development that is preponderant with respect to the base dimensions thereof (for cylindrical containers, for example, an axial length that exceeds the diameter by at least three times), supplied along a conveyor line.

DESCRIPTION OF THE PRIOR ART

Weighing apparatus are known that are arranged at one or more tracts of a conveyor line for containers, for weighing the containers moved thereby: by way of example these applications include the use of two weighing devices arranged upstream and downstream of a filling station, respectively for weighing containers that are empty and full of product, in order to calculate a quantity of product placed inside them. As is known, the weighing method can include weighing all the containers supplied along the conveyor line (100% type weighing) or only some batches (statistical weighing).

Weighing devices are known that have been designed to enable both types of above-mentioned weighing, in order to guarantee maximum flexibility of use according to applicational needs. In this regard, an example is constituted by patent EP1194333, owned by the present Applicant, which discloses a weighing apparatus and a conveyor line designed to render high productivity specifically for the 100% weighing mode.

The above-mentioned patent describes an operating unit for supplying containers along a conveyor line and for transferring the containers from the conveyor line to a weighing station, and vice versa.

The conveyor line comprises: a plurality of movement modules moved by a conveyor organ and conformed such as to define a series of V-shaped seatings suitable for receiving the containers by contacting the neck thereof and/or the body thereof; and a sliding tract, positioned inferiorly of the movement modules and fixed to the frame, on which the container drags when drawn by the movement modules.

The sliding tract exhibits an interruption at the weighing station. A mobile platform associated to the weighing station is provided for engaging in the sliding tract, in order to provide a continuity thereto; the platform is mobile between: a raised conveying position, in which it is arranged at the level of the sliding tract in order to restore the continuity and resting receive the containers supplied along the conveyor line; and a lowered weighing position, in which the platform is engaged with weighing means provided in the weighing station and arranged in proximity of the conveyor line, for temporarily restingly releasing the containers collected from the conveyor line onto the weighing means.

The platform is provided with openings and the weighing means include complementary opening supports, such that when the platform loads the containers it is close to reaching the lowered weighing position and the supports freely engage in the openings, receiving the containers restingly so that they can be weighed. For the whole weighing step, therefore, the platform must remain in the lowered position; thereafter, the platform performs a return run such as to return the weighed containers onto the conveyor line, following the same trajectory as the one performed during the outward run.

The platform is moved by means of a pair of bar linkages arranged in the weighing station, symmetrically with respect to a transversal plane to the conveyor line.

The weighing means are arranged, with respect to the conveyor line, in such a way that the containers resting on the relative weighing supports partially engage the conveyor line, requiring that the conveyor line be halted for the whole weighing step.

The position is close proximity of the weighing means with respect to the conveyor line is justified by the need to make the containers perform short and rapid runs, with the aim of minimising the time required for the weighing operations.

The above-described unit can be activated in order to perform a 100% or statistic weighing operation, with only the weighing times between a weighing mode and the other being different.

It is known that the accuracy of the weighing is connected to the weighing time; this is because of the inertia effect of the components of the weighing means etc. which cause an error in measurement which lasts for a time connected to the "settling" of the measuring device.

For elongate-type containers with a relatively small base in relation to the axial length thereof (for example vials or the like), however, the short and rapid runs they are subjected to during transfer towards and from the weighing means can cause their upturning, and thus their fall from a vertically-resting position. In a like case, the falling containers might interfere with mechanical parts in movement, compromising their functioning and/or even determining their breakage or clogging; the conveyor line in this case would have to be halted in order to remove the fallen containers; parts of machine might require sanitisation (sometimes immediate) if the containers were filled with product that tipped out onto them, fouling and even contaminating them.

SUMMARY OF THE INVENTION

The aim of the present invention therefore consists in providing an apparatus and a method for weighing containers supplied along a conveyor line, which are also particularly suitable for weighing elongate containers.

The above aims are attained with an apparatus according to claim 1, and a method according to claim 11.

In a preferred embodiment, an apparatus is provided for high-speed weighing of elongate containers supplied along a conveyor line, comprising: weighing means arranged laterally to a stretch of the container conveyor line; a support member suitable for restingly receiving at least a container; a first articulated system, comprising a first member, a second member hinged to the first member, a third member hinged to the first member and a fourth member which is hinged to the second member and the third member, the first articulated system being configured such as to impart a translating motion to the support member. The apparatus further comprises an articulated system comprising a connecting member, a fifth member hinged to the connecting member, a sixth member hinged to the connecting member and a seventh member which is hinged to the fifth member and the sixth member, the fifth member or the sixth member or the seventh member being connected to the support member, the second articulated system being configured such as to impart a rotary motion to the support member. The device is further configured and arranged with respect to the conveyor line such as to impress, by means of the first articulated system and the second articulated system, a translating and rotating motion to the support member between a first position, in which the support member is arranged at the stretch of the conveyor line such as to receive therefrom at least a containers, and a second position in which the support member engages with the weighing means in order to enable weighing of the at least a container by the weighing means.

The rotation of the support member during the travel towards and from the weighing means can advantageously impart to the containers transported thereby an inclined disposition with respect to a vertical direction, which is stabler as each container can rest on the support member with a bottom thereof and also with a variably larger or smaller portion of lateral surface thereof. Even elongate containers can therefore be moved towards, and weighed by, weighing means without compromising the normal functioning of the conveyor line.

In an embodiment, the fifth member or the sixth member can be connected to the second member, or to the third member, so as to receive motion therefrom. In this way, with a single activation (for example intervening only on the second member) a roto-translation of the support member can advantageously be obtained.

In a preferred embodiment, a method for weighing containers supplied in a vertical position along a conveyor line and exhibiting a bottom and a body with a lateral surface is provided. The method comprises steps of collecting at least a container to be weighed from the conveyor line by means of a support member that is suitable for receiving the container; transferring the container to be weighed from the conveyor line towards weighing means; weighing the container using the weighing means; and transferring the weighed container from the weighing means towards the conveyor means.

The method further comprises, during the transfer steps from the conveyor line towards the weighing means and vice versa, imparting a roto-translating motion on the container.

During the roto-translation, the container inclines with respect to a vertical direction, such that the container contacts the support member and the weighing means with the bottom and with at least a portion of lateral surface thereof.

In particular, in a preferred embodiment, the method comprises supplying and collecting the containers in a vertical position along and from the conveyor line, and weighing the containers in an inclined position.

BRIEF DESCRIPTION OF THE DRAWINGS

Specific embodiments of the invention will be provided in the following description according to what is set out in the claims and with the aid of the accompanying tables of drawings, in which:

DESCRIPTION OF PREFERRED EMBODIMENTS

Figure 1:
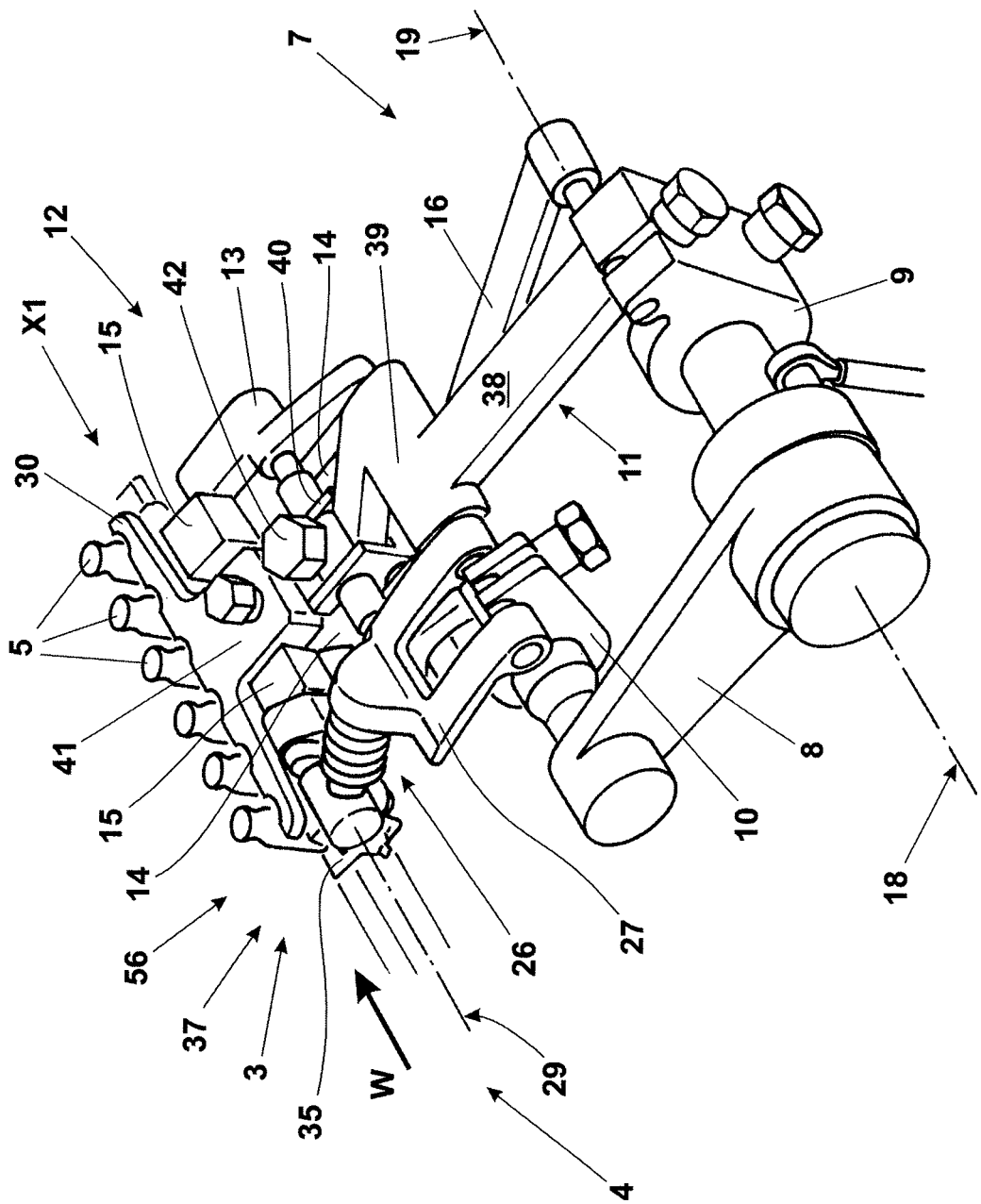
FIG. 1 is a perspective and schematic view of the device of the present invention.
Figure 2:
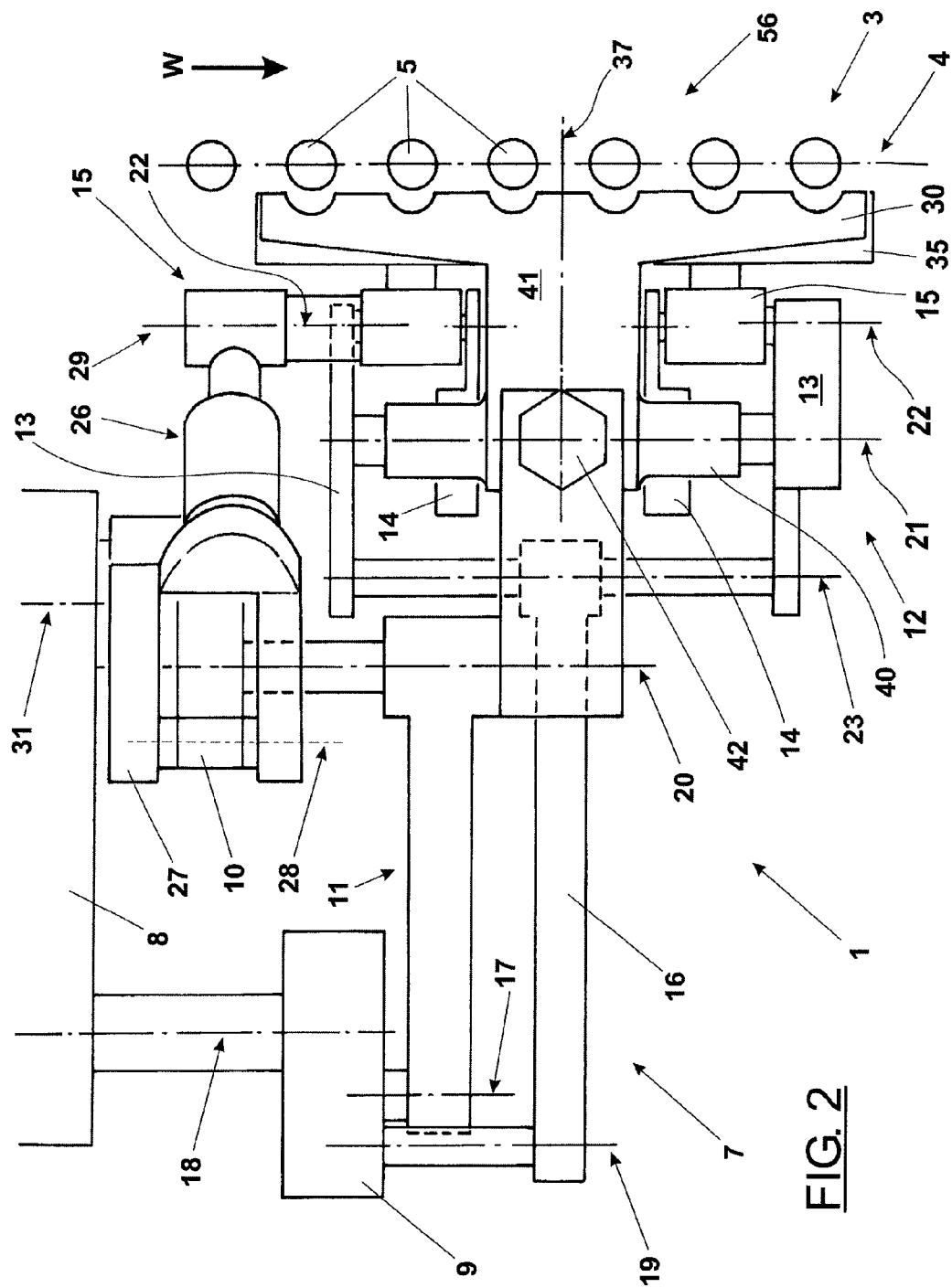
FIG. 2 is a view from above of the device of FIG. 1.

In general terms, the apparatus (1) for weighing elongate containers (5) supplied along a conveyor line (4), object of the present invention, comprises: weighing means (2) arranged laterally to a stretch (3) of the container conveyor line (4); a support member (6) suitable for restingly receiving at least a container (5); a first articulated system (7), comprising a first member (8), a second member (9) hinged to the first member (8), a third member (10) hinged to the first member (8) and a fourth member (11) which is hinged to the second member (9) and the third member (10), the first articulated system (7) being configured such as to impart a translating motion to the support member (6); a second articulated system (12) comprising a connecting member (40), a fifth member (13) hinged to the connecting member (40), a sixth member (14) hinged to the fourth member (11) and a seventh member (15) which is hinged to the fifth member (13) and the sixth member (14), the fifth member (13) or the sixth member (14) or the seventh member (15) being connected to the support member (6), the second articulated system (12) being configured such as to impart a rotary motion to the support member. The device (1) is further configured and arranged with respect to the conveyor line (4) such as to impress, by means of the first articulated system (7) and the second articulated system (12), a translating and rotating motion to the support member (6) between a first position (K1), in which the support member (6) is arranged at the stretch (3) of the conveyor line (4) such as to receive therefrom at least a container (5), and a second position (K2) in which the support member (6) engages with the weighing means (2) in order to enable weighing of the at least a container (5) by the weighing means (2).

In the illustrated embodiment, the containers (5) are advantageously weighed in an inclined position with respect to a vertical direction. In the inclined position the containers (5) rest on the weighing means (2) by a bottom thereof and at least a portion of lateral surface thereof.

The fifth member (13) or the sixth member (14) or the seventh member (15) can be connected to the second member (9) or the third member (10) in order to receive motion therefrom. In this way, with a single activation a roto-translation of the support member (6) can be obtained; otherwise, a second activation can be used (and thus a separate motorisation) acting directly on the support member (6) or on the fifth member (13) or the sixth member (14) or the seventh member (15) such as to impart a rotary motion on the support member (6).

In more detail, an eighth member (16) can realise the connection, which eighth member (16) is hinged demountably directly to the support member (6) or the fifth member (13) or the sixth member (14) or the seventh member (15) on one side and is always hinged demountably to the second member (9) or the third member (10) on the other side. In the illustrated embodiment of the figures, the eighth member (16) is rod-shaped and is hinged demountably to the fifth member (13) on one side and to the second member (9) on the opposite side.

Elastic means (26) can be interposed between the second member (9) or the third member (10) on one side and between the support member (6) or the fifth member (13) or the sixth member (14) or the seventh member (15) on the other side; the elastic means (26), if included, are arranged and configured such as to facilitate the return of the support member (6) from the second position (K2) to the first position (K1).

In more detail, the elastic means (26) can be hinged demountably, on the one side, to the second member (9) or to the third member (10) and can be hinged, again demountably, on the other side, to the fifth member (13) or the sixth member (14) or the seventh member (15).

The embodiment illustrated in the figures is now described, as a non-limiting example of the invention as described above, in general terms and claimed herein below.

The support member (6) comprises a base (35) for restingly receiving a bottom of the containers (5) to be weighed and a lateral wall (36) for contacting respective portions of lateral surfaces of the containers (5).

The conveyor line (4) moves containers (5) oblong, such as vials or the like and ampoules etc. along an advancement direction (W).

The conveyor line (4) comprises: a plurality of movement modules (not shown as of known type) movable along the advancement direction (W) and each conforming seatings suitable for receiving the containers (5) of a batch (56) of containers (5), contacting a neck and/or a body thereof; and a sliding track, (also not shown) positioned inferiorly of the movement modules and fixed to the frame, on which the containers (5) drag when they are drawn by the movement modules.

The sliding track exhibits an interruption (37) at the stretch (3) of the conveyor line (4), having a size that is equal to a longitudinal dimension of a module; the apparatus (1) of the invention is arranged at a first side of the stretch (3) of the conveyor line (4) and operates at this interruption (37), operatively restoring continuity to the sliding tracks via the support member (6), as will become clear in the following.

The movement modules are arranged at a second side of the conveyor line (4), opposite the first such as not to hinder operation of the apparatus (1).

The conveyor line (4) is step-advanced, with a step corresponding to the movement of a module at a time at the position of the interruption (37), so that the containers (5) of the batch (56) of containers (5) borne by each module are received restingly by the support member (6). In the above-cited first position (K1), the support member (6) restores the continuity of the conveyor line (4), being able to restingly receive the containers (5) of the batch (56) of containers (5) borne by a movement module, whereas in the second position (K2), following a roto-translating motion, the support member (6) supplies the containers (5) of the batch (56) of containers (5) to the weighing means (2) for the weighing operations; after which the support member (6), following a roto-translation motion, returns the weighed containers (5) onto the stretch (3) of the conveyor line (4) (returning to the first position K1 from the second position K2), and the conveyor line (4) is operated to transfer the containers (5) just weighed and to bring a subsequent batch (56) of containers (5) to be weighed onto the support member (6).

Lateral walls (not shown) for guiding the containers are provided upstream and downstream of the stretch (3) of the conveyor line (4), which lateral walls are at the first side of the conveyor line (4); the lateral walls cooperate with the movement modules for transporting the containers (5) along the conveyor line (4).

In the illustrated embodiment, the first articulated system (7) is advantageously placed in a position that is more distant from the conveyor line (4) relative to the position in which the second articulated system (12) is located; in other words, the second articulated system (12) is interposed between the portion (3) of the conveyor line (4) and the first articulated system (7).

Note that the first member (8), the second member (9), the third member (10), the fourth member (11), the connecting member (40), the fifth member (13), the sixth member (14), the seventh member (15) and the eighth member (16) can have different conformations from what is illustrated; each of them can also be formed from multiple parts which are solidly connected to one another or which are integral with each other; they are articulated with respect to horizontal articulation axes that are parallel to one another and parallel to the longitudinal development of the conveyor line (4).

By way of example, the fourth member (11) comprises a first part (38) which is hinged to the second member (9) and the third member (10), and a second part (39) which is fixed to the first part (38) and which is hinged to the third member (10). The connecting member (40) is solidly connected to the fourth member (11), in particular at the second part (39), via connection means (42). The connecting member (40) is also hinged to the fifth member (13) and the sixth member (14). In substance, the connecting means (42) solidly connect the first articulated system (7) to the second articulated system (12). A lateral element (41) is fixed to the connecting member (40) and exhibits a prominence (30) conforming seatings for abuttingly receiving portions of the necks of containers (5) of a batch (56) of containers (5). Each seating of the prominence (30) has an arched shape such as to restrict the movement of a corresponding container (5) in a parallel direction to the feeding direction (W).

The second member (9) is hinged: to the fourth member (11) via a first hinge axis (17); to the first member (8) via a second hinge axis (18); and to the eighth member (16) via a third hinge axis (19). A first joining segment (not shown) can be defined between the first hinge axis (17) and the second hinge axis (18) which is represented by the conjoining segment of the first hinge axis (17) with the second hinge axis (18), which conjoining segment is perpendicular to both hinge axes.

The fourth member (11) is hinged: to the second member (9) via the first hinge axis (17); to the third member (10) via a fourth hinge axis (20). The connecting member (40) is hinged to the fifth member (13) via a fifth hinge axis (21); and to the sixth member (14) via an eighth hinge axis (24). The fourth hinge axis (20) is interposed between the first hinge axis (17), on one side, and the eighth hinge axis (24) and the fifth hinge axis (21) on the other side. A second conjoining segment is defined between the first hinge axis (17) and the fourth hinge axis (20).

The first member (8) is hinged to the second member (9) via the second hinge axis (18) and is hinged to the third member (10) via a twelfth hinge axis (31); a third conjoining segment is therefore defined between the second hinge axis (18) and the twelfth hinge axis (31).

The third member (10) is hinged to the fourth member (11) via the fourth hinge axis (20) and to the first member (8) via the twelfth hinge axis (31); a fourth conjoining segment is defined between the fourth hinge axis (20) and the twelfth hinge axis (31).

The first articulated system (7) is in particular a bar linkage: the first conjoining segment has the same length as the fourth conjoining segment, while the second conjoining segment has the same length as the third conjoining segment. The second conjoining segment, consequently, always remains parallel to itself during the operation of the first articulated system (7); the second conjoining segment is, for example, horizontal, perpendicular to the above-mentioned hinge axes, i.e. transversal to the advancement direction (W). In other words, the fourth member (11) moves by translating motion and transmits this translating motion to the connecting member (40) of the second articulated system (12).

The fifth member (13) is hinged: to the connecting member (40) via the fifth hinge axis (21); to the seventh member (15) via a sixth hinge axis (22); and to the eighth member (16) via a seventh hinge axis (23). The fifth member (13) is arranged such that the fifth hinge axis (21) is interposed between the sixth hinge axis (22) and the seventh hinge axis (23).

The seventh member (15) is hinged to the sixth member (14) via a ninth hinge axis (25), to the fifth member (13) via the sixth hinge axis (22) and to the elastic means (26) via an eleventh hinge axis (29).

The second articulated system (12) is in particular a four-bar linkage, which imparts a rotary motion to the seventh member (15).

The sixth hinge axis (22) is superiorly arranged with respect to the ninth hinge axis (25) and inferiorly of the eleventh hinge axis (29).

The eighth hinge axis (24) is arranged below the fifth hinge axis (21).

The first hinge axis (17) is arranged above the second hinge axis (18) and below the third hinge axis (19).

The twelfth hinge axis (31) is arranged superiorly of the seventh hinge axis (23) and inferiorly of the fourth hinge axis (20).

The elastic means (26) comprise a spring and a ninth member (27); the ninth member (27) is hinged to the third member (10) via a tenth hinge axis (28), on one side, and is fixed to a first end of the spring, on the other side; the spring in turn is fixed, on one side, to the ninth member (27) and is hinged, on the other side, to the seventh member (15) via the eleventh hinge axis (29).

The seventh member (15) inferiorly bears the base (35) of the support member (6) and the lateral wall (36) of the support member (6).

By effect of the first (7) and second (12) articulated systems the seventh member (15), together with the base (35) and the lateral wall (36) connected to it, in particular constrained thereto, has a roto-translating motion.

The weighing means (2) comprise a load support (32) for restingly receiving the containers (5) of the batch (56) of containers (5) released from the support member (6); the load support (32) is connected to the balance (not shown) and makes the weighing of the containers (5) possible when the containers (5) are resting thereon. The load support (32) and the support member (6) are shaped in a complementary way to one another. The load support (32) comprises a support base (33) that develops along the stretch (3) of the conveyor line (4), and a plurality of projections (34) that originate from the base support (33) and extend upwards; the base support (33) forms a surface for contacting the bottom of the containers (5) of the batch (56) of containers (5), while the projections (34) conform surfaces for contacting the body, or a lateral surface of the containers (5) of the batch (56) of containers (5).

The base (35) of the support member (6) conforms for example, a comb, however, it is provided with openings (also in the guise of through-holes) for freely receiving the base support 33 and the projections (34); the projections (34), therefore, are sufficiently thin to occupy the space defined by the openings without contacting them.

Figure 3:
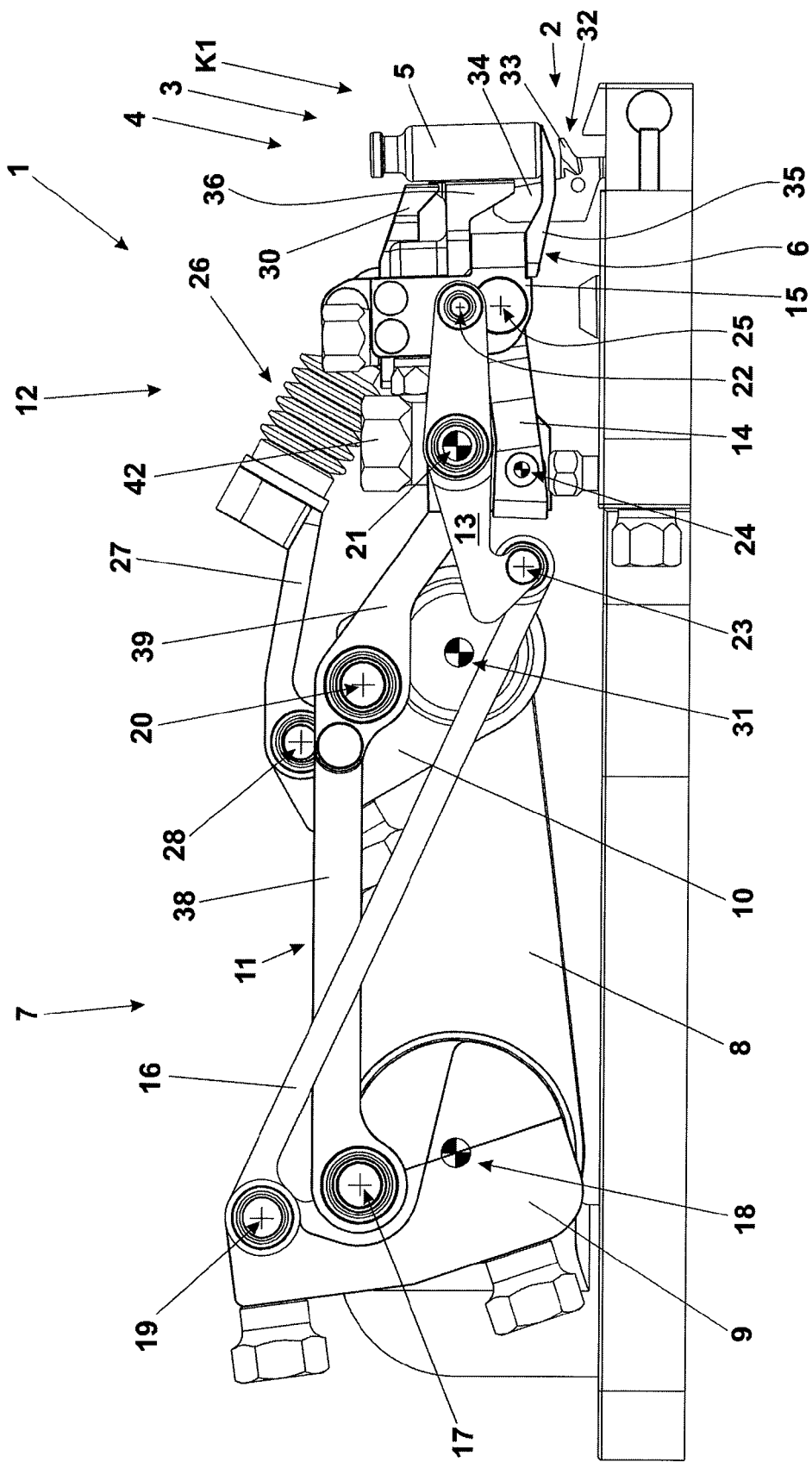
FIGS. 3, 4 and 5 are lateral views, according to the arrow X1 of FIG. 1, of the device of the invention, which represent, in greater detail and with greater precision, three different operating configurations of the device.
Figure 4:
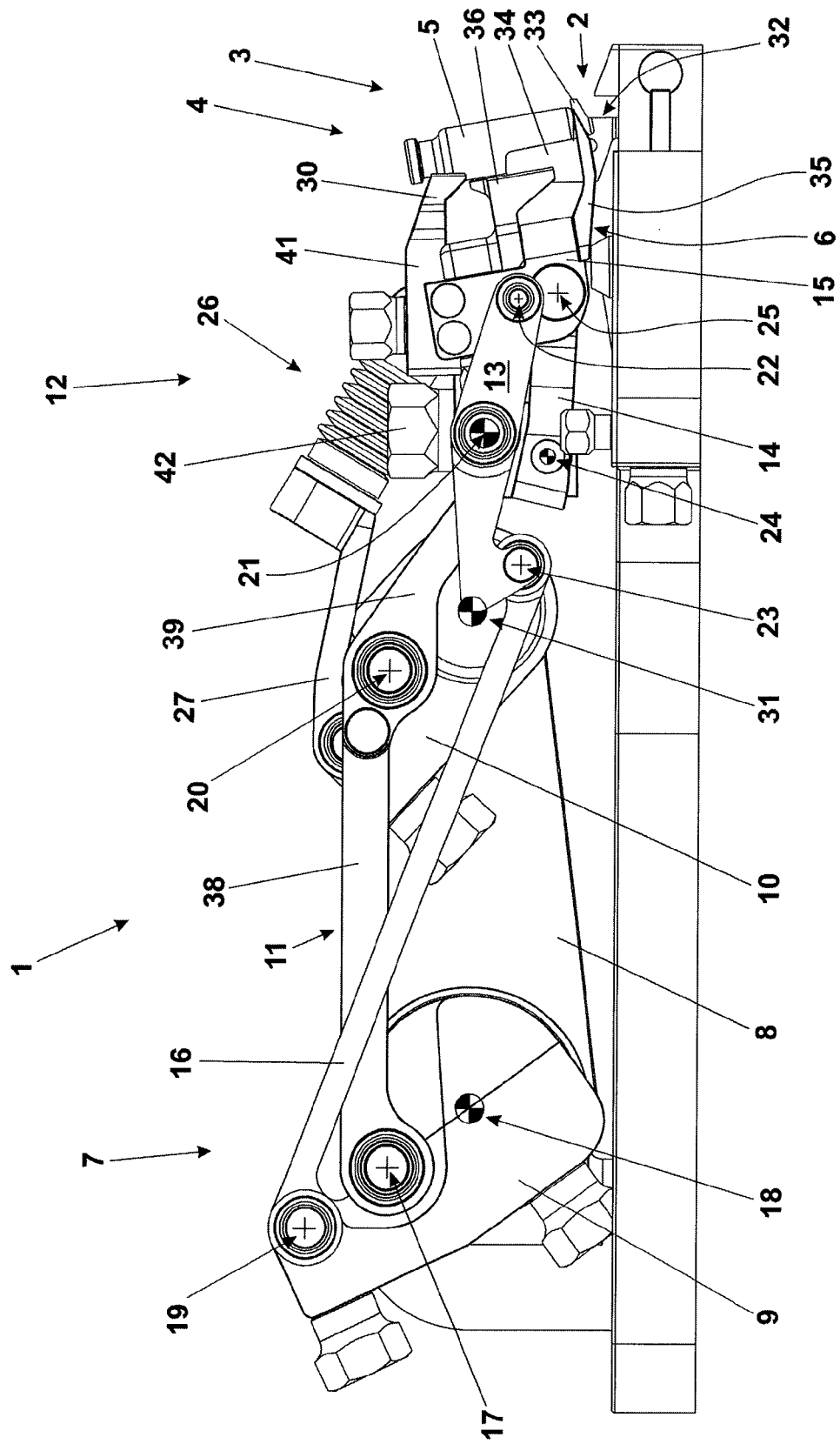
Figure 5:
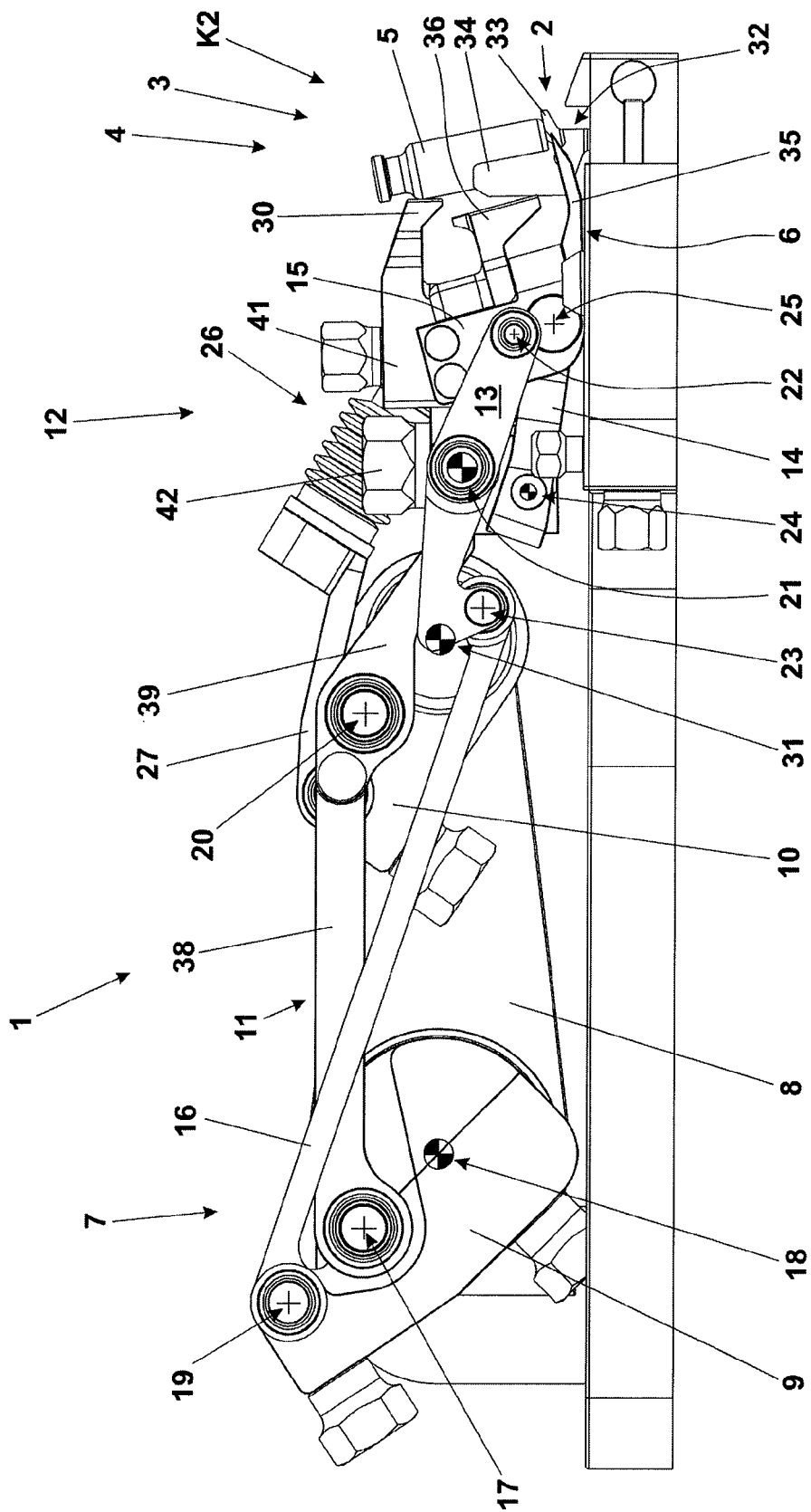

The apparatus (1) of the invention is configured such that the transfer of containers (5) always takes place without shocks and in a particularly stable and secure way. When the support member (6) is in the first position (K1) then the base (35) of the support member (6) restingly receives the bottom of the containers (5) of the batch (56) of containers (5), the lateral wall (36) of the support member (6) contacts the body, in particular a portion of the lateral surface, of the containers (5) of the batch (56) of containers (5), and the projections (34) of the load support (32) freely occupy the spaces identified by the openings of the base (35) of the support member (6), but do not contact the containers (5) (FIG. 3); when the support member (6) is in the second position (K2) then only the load support (32) contacts the containers (5) of the batch (56) of containers (5) via the corresponding projections (34) and the base support (33) (with reference to FIG. 5, it is specified that the projection 30 does not touch the containers 5). During the run of the support member (6) between the first position (K1) and the second position (K2) (and vice versa), the weighing means (2) are substituted for the prominence (30) and the support member (6) in supporting the containers (5): this step of exchanging is illustrated in FIG. 4 and takes place in a regular manner, without shocks or abrupt movements for the containers (5).

Thus, in the illustrated preferred embodiment the containers (5) to be weighed are moved on, and removed from, the conveyor line (4) in a vertical position, and are transferred to the weighing means (2) in order to be weighed in an inclined position. During the transfer to and from the weighing means (2), the containers (5) are supported at the base (35) and the lateral wall (36) of the support member (6), in order to avoid falls.

Thanks to the connection made by the eighth member (16), it is possible to rotate only the second member (9) about the second hinge axis (18) such as to obtain the roto-translation of the support member (6). As can be seen, the prominence (30) too, being connected to the fourth member (11), cooperates in the stable and secure transferring of the containers (5) of the batch (56) of containers (5) from the first position (K1) to the second position (K2) and vice versa, as described above.

It is understood that what above has been described by way of non-limiting example, and therefore possible constructive variants are possible, all entering within the ambit of protection of the present technical solution.

By way of example, in an alternative embodiment, the arrangement of the articulated systems can be varied; in particular the first articulated system can be arranged between the conveyor line and the second articulated system.

It is also possible, in this alternative embodiment, to activated only the second articulated system, instead of the first articulated system.

The invention claimed is:

1. Apparatus for weighing elongate containers each exhibiting a bottom and having a lateral surface and which are supplied along a conveyor line in a vertical orientation, comprising:
    a weighing device arranged laterally to a stretch of the conveyor line;
    a support member comprising a base and a lateral wall which contact and support, respectively, the bottom and the lateral surface of a container to be weighed;
    a first articulated system configured to transmit a motion of translation to the support member;
    a second articulated system configured to transmit a rotation motion to the support member,
    the apparatus being further configured and arranged with respect to the conveyor line such as to transmit a translation and rotation motion to the support member by means of the first articulated system and the second articulated system, between a first position, wherein the support member is arranged at said stretch of the conveyor line such as to receive therefrom and support with the base of the support member at least one container, and a second position, wherein the support member is inclined with respect to a vertical direction and engages with the weighing device to enable said weighing device to weigh said at least one container,
    wherein the second articulated system is configured to transmit a rotation to the support member during movement thereof from the conveyor line to the weighing device so as to incline the support member with respect to the vertical direction and thereby provide said at least one container with an inclined disposition with respect to the vertical direction at the weighting device so that the container is weighed by the weighing device in an inclined position with respect to the vertical direction, wherein during the transfer from the conveyor line to the weighing device the container is supported by the base and the lateral wall of the support member.

2. Apparatus according to claim 1, wherein the first articulated system includes a first member, a second member hinged to the first member, a third member hinged to the first member, and a fourth member hinged to the second member and the third member.

3. Apparatus according to claim 2, wherein the second articulated system includes a connecting member, a fifth member hinged to the connecting member, a sixth member hinged to the connecting member, and a seventh member hinged to the fifth member and the sixth member; the fifth member or the sixth member or the seventh member being connected to the support member.

4. Apparatus according to claim 3, wherein the fifth member or the sixth member or the seventh member is connected by means of an eighth member to the second member or the third member to receive motion therefrom.

5. Apparatus according to claim 3, including elastic means articulated to the second member or the third member on a side, and to the fifth member or the sixth member or the seventh member on another side; said elastic means being arranged and configured such as to facilitate a return of the support member from the second position to the first position.

6. Apparatus according to claim 3, wherein the support member is solidly constrained to the seventh member.

7. Apparatus according claim 2, wherein the first member is solidly constrained to a frame of the apparatus.

8. Apparatus according to claim 1, wherein the first articulated system is a parallelogram bar linkage.

9. Apparatus according to claim 1, including connecting means for connecting the first articulated system to the second articulated system.

10. Apparatus according to claim 3, including connecting means for connecting the fourth member to the connecting member.

11. Method for weighing elongate containers exhibiting a bottom and a lateral surface, comprising:
   supplying the containers in a vertical orientation along a conveyor line;
   drawing at least a container to be weighed from the conveyor line by means of a support member which contacts and supports said container;
   transferring the container to be weighed from the conveyor line to a weighing device by means of a translation and rotation of the support member, wherein during the translation and rotation of the support member the support member is inclined with respect to a vertical direction and contacts the container at the bottom and at a portion of the lateral surface of the container so as to incline the container with respect to the vertical direction and maintain the container inclined with respect to the vertical direction whereby the inclined container engages with the weighing device in an inclined orientation with respect to the vertical direction;
   weighing the container in the inclined orientation with respect to the vertical direction by means of said weighing device;
   transferring the container once weighed from the weighing device to the conveyor line by means a rotation and translation motion of the support member (6) so that the weighed container is returned to the conveyor line in a vertical orientation.

\* \* \* \* \*